US007051322B2

(12) United States Patent
    Rioux

(10) Patent No.: US 7,051,322 B2
(45) Date of Patent: May 23, 2006

(54) SOFTWARE ANALYSIS FRAMEWORK

(75) Inventor: Christien R. Rioux, Somerville, MA (US)

(73) Assignee: @Stake, Inc., Cambridge, MA (US)

( * ) Notice: Subject to any disclaimer, the term of this patent is extended or adjusted under 35 U.S.C. 154(b) by 290 days.

(21) Appl. No.: 10/314,005

(22) Filed: Dec. 6, 2002

(65) Prior Publication Data

US 2004/0111713 A1    Jun. 10, 2004

(51) Int. Cl.
    *G06F 9/45*    (2006.01)
(52) U.S. Cl. .................. 717/143; 717/132; 717/141
(58) Field of Classification Search ........ 717/124–128, 717/132, 140, 143, 145, 146, 151, 155–157, 717/177
    See application file for complete search history.

(56) References Cited

U.S. PATENT DOCUMENTS

| 4,533,997 | A |   | 8/1985  | Furgerson |         |
|-----------|---|---|---------|-----------|---------|
| 4,931,928 | A |   | 6/1990  | Greenfeld |         |
| 5,263,162 | A | * | 11/1993 | Lundeby   | 717/143 |
| 5,432,942 | A |   | 7/1995  | Trainer   |         |
| 5,590,330 | A | * | 12/1996 | Coskun et al. | 717/126 |
| 5,793,374 | A | * | 8/1998  | Guenter et al. | 345/426 |
| 5,854,924 | A | * | 12/1998 | Rickel et al. | 717/132 |
| 5,862,382 | A |   | 1/1999  | Kataoka   |         |
| 5,881,290 | A |   | 3/1999  | Ansari et al. |     |
| 5,933,635 | A | * | 8/1999  | Holzle et al. | 717/151 |
| 5,937,190 | A |   | 8/1999  | Gregory et al. |    |
| 6,009,256 | A |   | 12/1999 | Tseng et al. |      |
| 6,071,317 | A |   | 6/2000  | Nagel     |         |
| 6,125,439 | A | * | 9/2000  | Tremblay et al. | 712/202 |
| 6,151,701 | A |   | 11/2000 | Humphreys et al. |  |
| 6,154,876 | A |   | 11/2000 | Haley et al. |      |
| 6,240,376 | B1 |  | 5/2001  | Raynaud et al. |   |
| 6,243,848 | B1 |  | 6/2001  | Guignet et al. |   |
| 6,311,327 | B1 |  | 10/2001 | O'Brien et al. |   |
| 6,336,087 | B1 |  | 1/2002  | Burgun et al. |    |
| 6,412,106 | B1 |  | 6/2002  | Leask et al. |     |
| 6,594,761 | B1 | * | 7/2003 | Chow et al. | 713/190 |

(Continued)

FOREIGN PATENT DOCUMENTS

WO    WO 01/86427    11/2001

OTHER PUBLICATIONS

Breuer et al, "Decompilation the enumeration of types and grammers", ACM Trans. Prog. Lnag & Sys. vol. 16, No. 5, pp. 1613-1647, 1994.*

(Continued)

*Primary Examiner*—Anil Khatri
(74) *Attorney, Agent, or Firm*—Kudirka & Jobse, LLP

(57) ABSTRACT

Presently described is a decompilation method of operation and system for parsing executable code, identifying and recursively modeling data flows, identifying and recursively modeling control flow, and iteratively refining these models to provide a complete model at the nanocode level. The nanocode decompiler may be used to determine if flaws, security vulnerabilities, or general quality issues exist in the code. The nanocode decompiler outputs in a standardized, human-readable intermediate representation (IR) designed for automated or scripted analysis and reporting. Reports may take the form of a computer annotated and/or partially human annotated nanocode listing in the above-described IR. Annotations may include plain English statements regarding flaws and pointers to badly constructed data structures, unchecked buffers, malicious embedded code or "trap doors," and the like. Annotations may be generated through a scripted analysis process or by means of an expert-enhanced, quasi-autonomous system.

36 Claims, 4 Drawing Sheets

U.S. PATENT DOCUMENTS

| | | | |
|---|---|---|---|
| 6,601,235 B1* | 7/2003 | Holzle et al. | 717/151 |
| 6,766,481 B1* | 7/2004 | Estep et al. | 717/124 |
| 6,779,114 B1* | 8/2004 | Chow et al. | 713/189 |
| 6,820,256 B1* | 11/2004 | Fleehart et al. | 717/155 |
| 6,928,638 B1* | 8/2005 | Parvathala et al. | 717/124 |
| 6,961,925 B1* | 11/2005 | Callahan et al. | 717/128 |

OTHER PUBLICATIONS

Ural et al, "Modeing software for acurate data flow representaion", IEEE, pp. 277-286, 1993.*

Dejean et al, "A definition optimization technique used in a code translation algorithm", Comm.. of the ACM, vol. 32, No. 1, pp. 94-105, 1989.*

Mittal et al, "Automatic translation of software binaries onto FPGAs", ACM DAC, pp. 389-394, 2004.*

Ahpah Software, Inc. SourceAgain PC Professional, *Ahpah Software Inc. / SourceAgain PC Professional* retrieved from on Dec. 4, 2002.

Ahpah Software, Inc. SourceAgain and Java Decompilation—Updated Dec. 9, 2001. *White Paper: SourceAgain and Java* on Dec. 4, 2002.

Backer Street Software. REC—Reverse Engineering Compiler. *REC Decompiler Home Page* retrieved from on Dec. 3, 2002.

Blume, W.J. Symbolic Analysis Techniques for Effective Automatic Parallelization. *University of Illinois at Urbana-Champaign* (1995).

Blume, W. & Eigenmann, R. Demand-driven, Symbolic Range Propagation. *University of Illinois at Urbana-Champaign*, 1-15 (1995).

Breuer, P.T. and Bowen, J.P. (1992d). *Generating Decompilers*, Draft, Oxford University Computing Laboratory. Submitted for publication.

Business Wire. The Kemel Group Unveils Java Support for AutoTrace; Serviceability Solution Expands Capabilities; Provides Java Support and Key Features that Extend its Power and Flexibility. (Jun. 4, 2001).

Choi, J.-D. & Ferrante, J. Static Slicing in the Presence of GOTO Statements. *IBM T.J. Watson Research Center*.

Cifuentes, C. Reverse Compilation Techniques. *Queensland University of Technology* (Jul. 1994).

Cifuentes, C. An Environment for the Reverse Engineering of Executable Programs. *Proceedings of the Asia-Pacific Software Engineering Conference (APSEC)*. IEEE Computer Society Press. Brisbane, Australia. Dec. 1995, pp. 410-419.

Cifuentes, C. Partial Automation of an Integrated Reverse Engineering Environment of Binary Code. *Proceedings Third Working Conference on Reverse Engineering*. Monterey, CA, (Nov. 8-10, 1996) IEEE-CS Press. pp. 50-56.

Cifuentes, C. & Fraboulet, A. Intraprocedural Static Slicing of Binary Executables. *University of Queensland, Dept. Comp. Sci., Centre for Software Maintenance*.

Cifuentes, C. & Gough, K.J. Decompilation of Binary Programs. *Software—Practice & Experience*. vol. 25, 811-829 (Jul. 1995).

Cifuentes, C. & Sendall, S. Specifying the Semantics of Machine Instructions. *University of Queensland, Dept. Comp. Sci. & Elec. Eng.* Technical Report 442 (Dec. 1997).

Cifuentes, C. & Simon, D. Procedural Abstraction Recovery from Binary Code. *University of Queensland, Dept. Comp. Sci. & Elec. Eng.* Technical Report 448 (Sep. 1999).

Cifuentes, C. & Van Emmerik, M. Recovery of Jump Table Case Statements from Binary Code. *University of Queensland, Dept. Comp. Sci. & Elec. Eng.* Technical Report 444 (Dec. 1998).

Cifuentes, C. et al. Assembly to High-Level Language Translation. *University of Queensland, Brisbane, Australia, Dept. of Comp. Sci. & Elec. Eng.* Technical Report 439, (Aug. 1993).

Cifuentes, C. et al., *University of Queensland, Dept. Comp. Sci. & Elec. Eng.* & Ramsey, N., *University of Virginia, Dept. Comp. Sci.* The Design of a Resourceable and Retargetable Binary Translator.

Cytron, R. et al. Efficiently Computing Static Single Assignment From and the Control Dependence Graph. *IBM Research Division* (Mar. 7, 1991).

Duesterwald, E. et al. A Practical Framework for Demand-Driven Interprocedural Data Flow Analysis. *ACM Transactions on Programming Language and Systems* 19, 992-1030 (Nov. 1997).

Dyer, D. Java decompilers compared ; Our detailed examples of how 3 top decompilers handle an extensive test suite will help you determine which, if any, meet your needs. *JavaWorld* (Jul. 1997).

Gough, J., *Queensland University of Technology* & Klaeren, H., *University of Tubingen*. Eliminating Range Checks using Static Single Assignment Form. (Dec. 19, 1994).

Gupta, R., *University of Pittsburgh*. Optimizing Array Bound Checks Using Flow Analysis. *ACM SIGPLAN Conference on Programming Language Design and Implementation*, White Plains, N.Y. Preliminary version (1995).

Harrold, M.J. & Soffa, M.L. Efficient Computation of Interprocedural Definition-Use Chains. *ACM Transactions on Programming Language and Systems* 16, 175-204 (Mar. 1994).

Hollingum, J. Arithmetic robot modules control robotic production. *Industrial Robot* 22, 32-35 (1995).

Liang, D. & Harrold, M.J. Light-Weight Context Recovery for Efficient and Accurate Program Analyses. *Proceedings of the 22nd International Conference on Software Engineering* 1-10 (Jun. 2000).

Liang, D. & Harrold, M.J. Efficient Computation of Parameterized Pointer Information for Interprocedural Analyses. *Georgia Institute of Technology* Tech Report GIT-CC-00-35, 1-17 (Dec. 2000).

MacUser. Programming & systems; Software Review; software for the Apple Macintosh computer, Evaluation. vol. 8, 237 (Jan. 1993).

Mycroft, A. Type-Based Decompilation. *Cambridge University, Computer Laboratory*.

Orso, A. et al. Effects of Pointers on Data Dependences. *Georgia Institute of Technology, College of Computing* Technical Report GIT-CC-00-33, 1-17 (Dec. 2000).

Patterson, J.R.C. Accurate Static Branch Prediction by Value Range Propagation. *Proc. ACM SIGPLAN Conference on Programming Language and Design Implementation* La Jolla, San Diego, 67-78 (Jun. 1995).

Pingali, K. & Bilardi, G. Optimal Control Dependence Computation and the Roman Chariots Problem. *ACM Transactions on Programming Languages and Systems*. 19, 1-30 (May 1997).

Reilly, D. Decompilers—friend of foe? *Java Coffee Break* updated Jun. 2, 2001 retrieved from.

Sagiv, M. et al. Precise Interprocedure Dataflow Analysis with Applications to Constant Propagation. *University of Wisconsin-Madison, Computer Sciences Dept.*

Saul, J. M. Hardware/Software Codesign fir FPGA-Based Systems. *Proceedings of the 32nd Hawaii International Conference on System Sciences* (1999).

Sinha, S. & Harrold, M.J. Analysis and Testing of Programs with Exception-Handling Constructs. *IEEE Transactions on Software Eng.* 26, 1-24 (Sep. 2000).

University of Queensland, Comp. Sci. & Elec. Eng. The dcc Decompiler, updated on May 4, 2002, retrieved from.

Van Emmerik, M. Signatures for Library Functions in Executable Files. *Queensland University of Technology, Information Security Research Centre.*

Van Tyle, S. Engineering software tools meet demands. *Electronic Design* 42, 71 (Jun. 27, 1994).

* cited by examiner

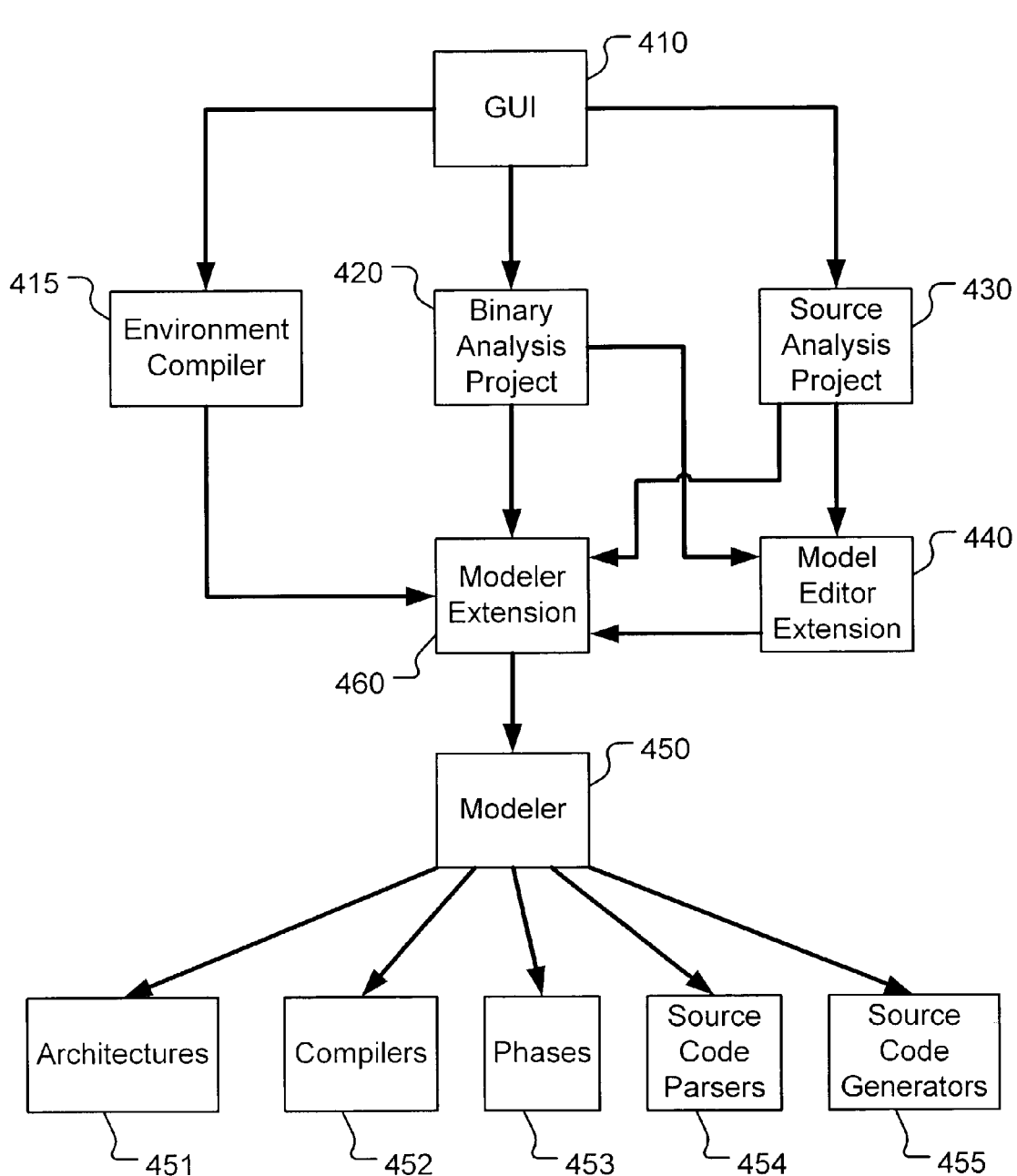

SOFTWARE ANALYSIS FRAMEWORK

COPYRIGHT NOTICE

This disclosure contains material which is subject to copyright protection. The copyright owner has no objection to the facsimile reproduction by anyone fo the patent document or the patent disclosure, as it appears in the Patent and Trademark Office patent file or records, but otherwise reserves all copyright rights whatsoever.

BACKGROUND OF THE INVENTION

1. Field of the Invention

The present invention relates to computer software analysis systems, more specifically to software decompilers.

2. Description of the Related Art

Generally speaking, the term "software decompiler" refers to a computer program, or set of program instructions, that parses a second, compiled computer program presented in executable code (e.g., binary) form and provides as an output a set of human-readable program instructions that represent the functions of the compiled program. Compiled software is generally presented in machine executable code (binary) form, without comments or other human-readable content included. As is well-known in the art, compiled or executable computer instructions comprise the microprocessor specific codes that cause a microprocessor to execute its own built-in functions.

The general purpose of a decompiler is to take executable code and return it back into a human-readable representation that allows a programmer to analyze the functions of the software and, in particular, its flaws and vulnerability to exploitation and/or hacking. Decompilers can also be used to analyze software for compliance with various standards, such as the widely publicized Year 2000 (Y2K) potential vulnerability.

In preparing a human-readable representation of compiled software code, a decompiler must determine both the control flow of the program as well as the data flow. "Control flow" refers to the logical execution sequence of program instructions beginning, logically, at the beginning, traversing various loops and control-transferring statements (branches), and concluding with the end or termination point of the program. "Data flow" refers to the process within the program whereby variables (or data storage elements, i.e., data that is stored in program memory either dynamically or statically on some external memory unit, such as a hard drive) are read from and/or written to memory. Data flow includes the process whereby variables or data inputs or outputs are defined by name and content and used and/or modified (i.e., redefined) during the execution of the program. Programmers of ordinary skill in the art will of course realize that many high-level languages require some sort of definition or typecasting of each variable before its first use. The data flow analysis portion of the decompilation process is not, however, concerned with initial declaration of data type but rather determining when and where variables are defined, how they are parsed, and whether they are local to a particular process or sub process, or globally available ("global") for use throughout the program.

One shortfall seen in prior art decompilers is that, while they seek to provide a representation of the original compiled and executable software, they often fail to provide a complete model of the software of that program such that the model could be itself recompiled into a functional equivalent of the original compiled and executable program. Furthermore, prior art decompilers are known to use imprecise and incomplete statement modeling tools, resulting in incompletely defined data flow and/or control flow. These shortcomings result in code models that do not sufficiently represent the complete control flow and data structures of the targeted compiled, executable code. In such incomplete models, security vulnerability and forensic analysis is often infeasible or (at best) inaccurate.

What is needed is a nanocode level decompiler that provides a sufficiently accurate model of software operation for complete security vulnerability analyses and forensic study of failed, malfunctioning, or suspect code. "Nanocode" refers to individual processor instructions that have been decomposed into their semantic meaning (to the processor) at their lowest (near-electrical) level. "Nanocode level" refers to the level of coding that represents these fundamental steps and structures. What is also needed is a complete decompiling process and toolset that allows a full representation of the control and data flows of a target program such that all instructions and internal processes are fully represented at the nanocode level.

SUMMARY

Presently described is a decompilation method of operation and system for parsing executable code, identifying data flows, modeling those data flows in an iterative and converging fashion, identifying and modeling control flow, and iteratively refining the control flow model to provide a complete model of all data flows and control flow at the nanocode level.

In particular, a code model is built by generating a complete data and control flow graph, both of which (data and control flow) depend on each other. Generating the entire set of flow graphs comprises: (1) starting at an entry point; (2) deriving the known control flow graph; (3) deriving the known data flow graph; (4) performing range propagation; (5) extending the control flow graph and the data flow graph; (6) repeating from step (2) until there is nothing left to extend in step (5).

The nanocode decompiler may be used, in some embodiments, as an analysis platform to determine if security vulnerabilities or general quality issues exist in control flow, control logic, or data organization of the modeled code. Because the nanocode level decompilation can preserve and accurately represent the complete details of program operation, such an analysis of the modeled code (rather than the original code) is both feasible and highly efficient. (Note that the decompiler does not produce vulnerability information directly. Rather, it produces a complete set of data and control flow graphs that one of certain skill can analyze using scripted analysis tools or other resources outside the scope of the present disclosure.

Efficiency arises from the fact that the nanocode decompiler outputs a standardized, human-readable intermediate representation designed for automated or scripted analysis and reporting. This intermediate representation is adapted for use both as an analytic basis and as a reporting tool: the intermediate representation is specifically chosen so that the control flow, data flow, and data structures can be represented in a human-readable form usable by both software security analysts and technical personnel.

The nanocode decompiler may produce as one of its outputs a report showing the flaws, vulnerabilities, and/or poor programming practices in the original executable code. This report may take the form of a computer annotated and/or partially human annotated nanocode listing in the above-described intermediate representation. Annotations in this listing may include plain English statements regarding flaws and pointers to badly constructed data structures, unchecked buffers, malicious embedded code or "trap doors," and the like. These annotations may be generated entirely through a scripted analysis process looking for commonly known flaws and vulnerabilities (for example, the type of analysis used by common virus checking software known in the arts today) or by means of an expert-enhanced, quasi-autonomous system which may include a human expert performing live analysis on the nanocode model.

BRIEF DESCRIPTION OF THE DRAWINGS

The present disclosure may be better understood and its numerous features and advantages made apparent to those skilled in the art by referencing the accompanying drawings.

FIG. 3 is a high-level modularity dependence diagram of an automated analysis generation subsystem, according to one embodiment of the invention.

The use of the same reference symbols in different drawings indicates similar or identical items.

DETAILED DESCRIPTION

Figure 1:
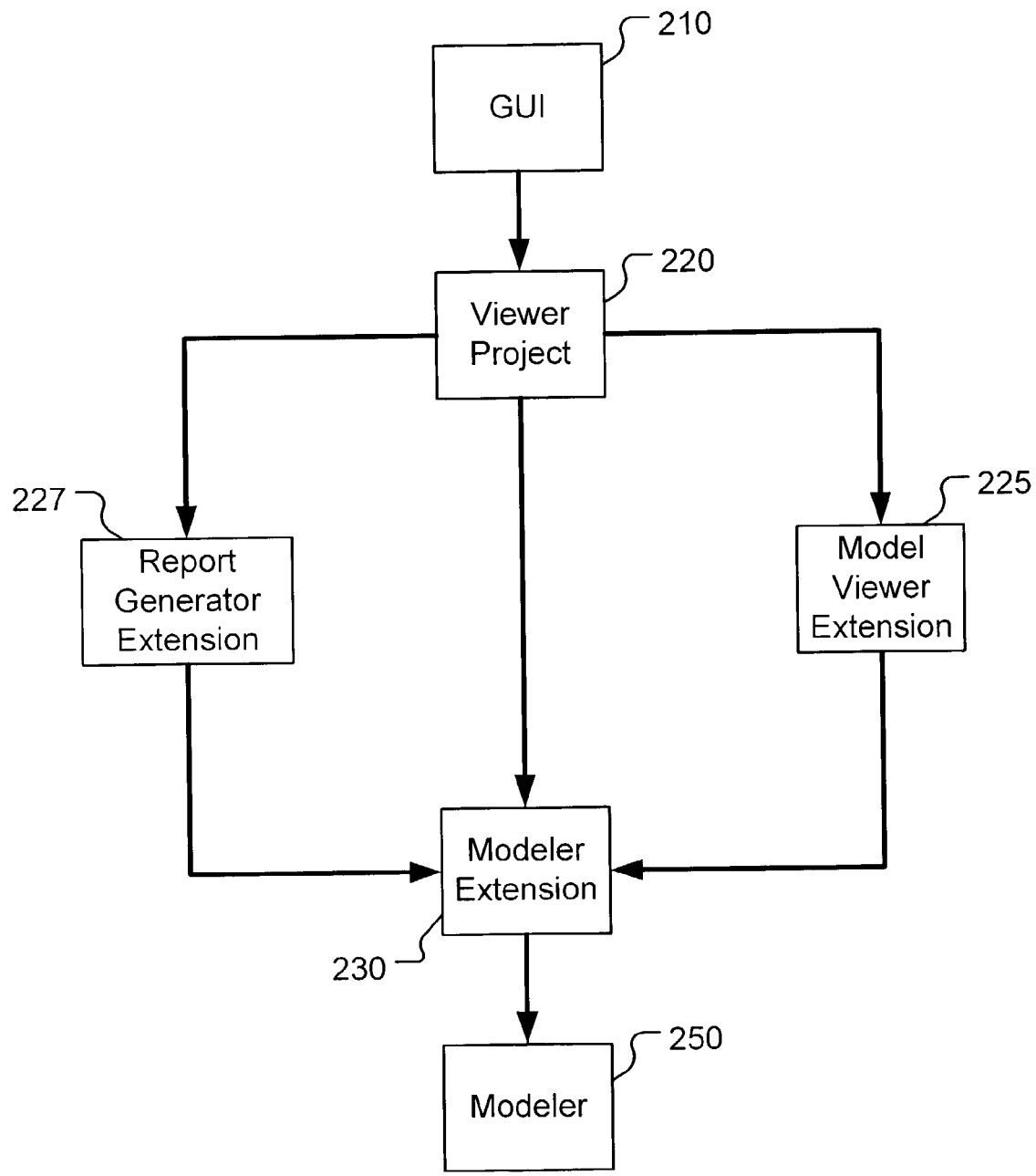
FIG. 1 is a high-level block diagram of a nanocode decompilation process, according to one embodiment of the invention.

The Software Analysis Framework (SAF) represents one of many possible embodiments of a nanocode decompiler. Its primary function is to model software operation starting from either executable code or (if available) source code written in a high-level language. The SAF creates an intermediate representation (IR) that describes the low-level code functionality (as implemented in the target microprocessor) as well as the high-level functionality of the program itself. This model describes both the data flows and the control flow within the program at all times.

One process whereby SAF produces a nanocode model of the target executable code is an iterative marriage of both data flow and control flow modeling in a double feedback loop. The resulting merger of data flow and control flow in the model is of course only one decompilation of the original executable code, but it is sufficiently accurate for purposes of nanocode level modeling.

Decompilers having limited capabilities are known in the art. See, for example, U.S. Pat. No. 6,151,701 "Methods for Reconstructing Debugging Information for a Decompiled Executable File" to Humphreys, et al.; PCT Publication No. WO 01/86427, "Transformation of Objects Between a Computer Programming Language and a Data Representation Language," by Sun Microsystems, published on Nov. 15, 2001; Breuer et al., "Decompilation: The Enumeration of Types and Grammars," J. ACM, pp. 1613–1647, September 1994; and Aho, et al., *Compilers: Principal, Techniques, and Tools*, pp. 463–473, March 1998, Addison-Wesley Publishing Company, all of which are hereby incorporated herein by reference in their entireties.

In the Software Analysis Framework exemplary embodiment, the Nanocode decompiler consists of a platform-specific front-end further comprising a loader and unlinker. The loader and unlinker read ("load") the target executable code into memory and unlink the various segments of code from one another through standard methods known in the art to produce stand-alone modules according to the organization of the executable code.

Data Flow Transformer

Next, the data flow transformer (which is itself a recursive data flow discoverer, model optimizer, and data propagation tool) acts iteratively on the unlinked modules of executable code to produce a model of the data flow. Table 1 illustrates a data flow transformer algorithm, in pseudo-code form, according to one embodiment of the present invention.

TABLE 1

Data Flow Transformer

```
© 2002, AtStake, Inc.
    Call each of the DFT sub-phases in order, with a double nested
loop. The subphase ordering is as follows:
Variablizer:
    for every procedure {
        for every basic block {
            for every expression {
                Find definitions and uses (registers, variables,
derefences)
                For each definition {
                    Extract a matching expression
                    Create variable memory range for matching
expression and tag with match expression id.
                    Propagate definition forward, comparing
matching expressions with extracted use matching expressions:
                        If we find an overlapping matching
expression, then we merge variables and replace with indexed
expressions if appropriate.
                }
                For each use {
                    Extract a matching expression
                    Create variable memory range for matching
expression and tag with match expression id.
                    Propagate use backward, comparing matching
expressions with extracted def matching expressions:
                        If we find an overlapping matching
expression, then we merge variables and replace with indexed
expressions if appropriate.
                }
            }
        }
        for every basic block transition edge {
            Compare definitions on front of edge to uses on rear of
edge:
                Merge stuff together that have overlapping matching
expressions
        }
        for every basic block {
            for every expression {
                Find definitions and uses
                For each definition and use {
                    Extract a matching expression
                    Replace definition or use with variable that
overlaps the matching expression
                }
            }
        }
    }
Optimization:
    do {
        Copy constant propagation
        Expression simplification
        Idiom replacement
    } until( we had no idiom replacements )
Main Loop:
    do {
        Import unprocessed code
        Procedure identification
        while(Variablizer) {
            Argument and return variable detection
            Compiler-specific call->expoper reduction
            Type voting
            Optimization
```

TABLE 1-continued

Data Flow Transformer

```
    }
    Find new code
} until(we find no more new code)
```

DFT Sub-Phases

Import Unprocessed Code: For each empty sequence (initially, just the program entry point(s)), decode instructions and add to the sequence, starting new sequences for the outputs of statements that have multiple out branches, and splitting sequences that we jump to the middle of. This builds a flow-graph of unstructured sequences with no procedure information.

Procedure Identification: Identify procedures through either 'obvious' procedure analysis (call/ret finding), or possibly a more involved analysis for more arcane RISC CPU's that don't have explicit call/ret syntax. Generate control flow notes on all flow control statements and expressions, and called procedures and targeted sequences. Parent the sequences under their procedures as appropriate. Merge return sequences to have a single point of exit. Perform return stack offset conversion on all edges leaving a procedure.

Argument and return variable detection: Identify what variable uses are not defined before they are used. These become arguments. Return variables are the definitions of a procedure that are live upon exit. These all get added to an annotation, not to the prototype (that gets done in the next step).

Compiler-specific call->expoper reduction: The compiler module is called for each CALL statement, in order to reduce it to an oper expression. If a calling convention can be applied, it is done, and the prototype for the procedure is defined appropriately. Calls are then converted to oper expressions in the form of 'retval=oper(arg1,arg2 . . . ).' Return variables are always created if possible, and if they are not used, then optimization will remove the assignment.

Type Voting: Allows operations to vote on the types of their operands and return values. Once popular types for variable classes and prototype arguments/return-values are determined, we loop again for another round of voting, continuing this until no type propagation occurs. Since we only upgrade types to more specific types, this process must terminate in a fixed amount of time. Once type propagation is completed, we go through and apply typecasts to resolve any conflicting or ambiguous votes.

Copy Constant Propagation: Also known as 'constant folding,' this operation collapses definitions of variables that remain constant into their uses. Greatly simplifies the code and reduces the number of variables, expressions, and statements.

Expression Simplification: For each expression in the program, we pass it through a symbolic simplifier, reducing it and performing immediate arithmetic. This complements the copy constant propagation operation and reduces the number of expressions, statements, and variables in the system. This step also removes any unused definitions and throws away 'no operation' statements.

Idiom Replacement: A form of primitive control flow analysis, idiom replacement matches known patterns of expressions with simpler ones that have more meaning. This phase reconstructs things such as 64-bit arithmetic on 32-bit processors, and replaces optimization semantics with their simplest valid representation.

Find new variables: Using value range propagation on data dereferences, we find what ranges of the stack, and of main memory (and object memory relative to 'this'), warrant the creation of new variables. These variables are added to the system. They are possibly aliased, and many times will have overlapping memory areas. This is resolved through another pass through the variable SCA and propagation.

Find new code: Using value range propagation on code dereferences, we find what ranges of the program's image space are accessed and haven't been decoded or assigned procedures yet. These entry points are marked for decoding upon another pass through the Import Unprocessed Code step.

Helper Classes and Procedures

Value Range Propagator: Takes in an expression and a list of 'relative elements', and returns a low-high range and a 'relative expression' built solely of the relative elements. This allows for us to say that when called with the expression (esp+eax) and 'relative elements' equal to 'esp', and that 'eax' can take on the values 0 through 10 at this point, that the value range propagator could return:

(low=0,hi=10,relativeto=ESP)

D/U List Generator: Given a variable, tells us where it is defined, and where it is used. This utilizes value range propagation to tell us about modifications of the variable even through aliasing. Since modification to the code happens frequently, D/U lists are always generated on the fly, as caching them will prove inefficient.

Variable Memory Frame: A virtual 'memory continuum' that keeps track of what variables use what spans of memory. A memory frame keeps track of a memory space relative to a particular object, usually the base of main memory, a register (such as the stack), and perhaps even the 'address of a register' to aid in the unaliasing of registers that overlap (such as the x86 registers AX and AH).

Various Notes: Notes need to be created for type voting, control flow information, and possibly inter/intraprocedural propagation.

Control Flow Transformer

A control flow transformer, operating in an outer loop, acts on the data model discovered in the data flow transformer to model, optimize (refine), and propagate the control flow.

The data flow transformer (DFT) operates iteratively on each unlinked module of the executable code, first finding an approximate or "fitting" data flow model, and then interacting to create a "refined" or more precise data flow model. After a refined data flow model is determined for each module, the control flow is iteratively modeled using the control flow transformer (CFT) on that same data module. The CFT operates in a fashion similar to the DFT: a first, fitting control flow model is approximated from control flow graphs and then iteratively improved to form a refined control flow model representing all necessary states and branches within the code.

This double loop occurs on each module, in sequence, through the program, iterating within the DFT and CFT until an optimized (refined) model is produced for each module.

Finally, and optionally, a language-specific backend may be used to transform the intermediate representation into a, high-level representation of the original (target) executable code. In one embodiment, the specific language is C++. In other embodiments, the high-level language could be C, C#, Objective C, Java, Pascal, Visual Basic, or any other high-level programming language.

In one embodiment, the intermediate representation used to describe the Nanocode data flow and control flow model may be the DIL Intermediate Language (DIL), which is designed to capture the fine-grain detail of a nanocode level model. DIL is a compact grammar and syntax used to represent the primitive functions, operands, and control/data flows independently of the original source language or target procession. The DIL syntax and grammar may follow, in some embodiments, that noted in Table 2 below.

TABLE 2

```
© 2002, AtStake, Inc.
whitespace := " \t\n\r"
identifier := [a-zA-Z_%!] [a-zA-Z0-9_%!]*
string := "\"" ~[\"]* "\""
number := ( decnumber ? hexnumber ? binnumber ? octnumber )
decnumber := {-}[0-9]+
hexnumber := {-}0[xX] [0-9A-Fa-f]+
binnumber := {-}0[bB] [0-1]+
octnumber := {-}0[oO] [0-7]+
ascnumber := "'" ( ~[ ] ) "'"
data := "[" hexnumber ( "," hexnumber )* { ":" binnumber } "]"
reference := scopename ? exp_replacement
instance_arg := "*" ? scopename ? expression
scopename := { "::" } identifier { "<" { instance_arg ( "," instance_arg )* } ">"
} { "::" scopename }
named_scope := (variable ? namespace ? prototype ? procedure ? register ? class ?
template ? special)*
extend := "extend" scopename named_scope
expression := (exp_immed ? exp_object ? exp_oper ? exp_this ? exp_replacement ?
exp_cast)
exp_immed := ( "#" { reference ":" } string ) ? number
exp_object := "$" reference { "<-" expression }
exp_oper := "(" expression ( expression )* ")"
exp_this := "$$"
exp_replacement := "@" identifier { ":" reference }
exp_cast := "[" reference "]" expression
catch := "catch" "(" { variable } ")" sequence
class_inheritance := ( "public" ? "private" ? "protected" ) { "virtual" } ":"
reference
class_inherits := { "inherits" class_inheritance ( "," class_inheritance )* }
class_members := "{" (
                ( "public" ":" ) ? ( "protected" ":" ) ? ( "private" ":" ) ?
                variable ? namespace ? prototype ? template ? class ? procedure
                )* "}"
class := "class" { string }
        ( "implicit" ? "union" ? "constant" ? "volatile" ? "incomplete" )*
        { "align" "=" number }
        { "layout" "=" string }
        { "dataformat" "=" string }
        { class_inherits }
        { class_members }
namespace := "namespace" { string } { namespacemembers }
namespacemembers :=
    "{"
    (variable ? namespace ? prototype ? procedure ? register ? class ? template )*
    "}"
prototype_arguments := "(" object ( "," object )* { "..." } ")"
prototype := "proto" { string } { "convention" "=" string } { "method" } {
"incomplete" }
        { prototype_arguments } { ">" "[" object "]" }
storageclass := ( "normal" ? "ref" ? "relative" )
procedure := "proc" { string }
        { storageclass }
        { "match" expression }
        { ( "using" reference ) ? ( "with" prototype ) }
        { sequence }
register := "register" { string } { "{"
        { "type" "=" reference }
        { "base" "=" reference "," number "," number }
        ( "parent" reference "match" expression )*
        "}" }
sequence := { identifier ":" } "{" ( statement )* "}"
statement := { identifier ":" }
        ( stmtasm ? stmtbreak ? stmtcontinue ? stmteval ? stmtifelse ?
stmtjump ?
        stmtloop ? stmtnop ? stmtreturn ? stmtswitch ? stmtthrow ? stmttrap
?
        stmttrapret ? stmttry )
stmtasm := "asm" "(" data ( "," (">"?"<"?">"">"<"">") expression )+ ")"
stmtbreak := "break" number
```

TABLE 2-continued

```
stmtcall := "call" expression
stmtcontinue := "continue" number
stmteval := "eval" expression
stmtifelse := "if" expression sequence { "else" sequence }
stmtjump := "jump" { "on" expression } "to" expression
stmtloop := "loop" { "with" sequence } { "while" expression }
        "do" sequence
        { "while" expression } { "next" sequence }
stmtnop := "nop"
stmtreturn := "return"
stmtswitch := "switch" expression "{"
        ( ( "case" expression sequence ) ? ( "default" sequence ) )*
        "}"
stmtthrow := "throw" expression
stmttrap := "trap" expression
stmttrapret := "trapret"
stmttry := "try" sequence { "finally" sequence } ( catch )*
template := "template" { string } { "<" ( identifier ":" identifier )* ">" } "{"
( special )* "}"
type := class ? prototype
object := register ? procedure ? variable
special := "special" { string } { "of" reference }
        { "with" "<" ( instance_arg ? "*" ) ( "," ( instance_arg ? "*" ) )*
">" }
        { ":" ( class ? prototype ? variable ? procedure ) }
variable := "var" { string }
        { ":" reference } { storageclass }
        { "match" expression } { "=" expression }
```

The following references describe many examples of constituent techniques and algorithms known in the art for performing basic decompiling functions and are hereby incorporated herein in their entireties.

Cifuentes, C., *An Environment for the Reverse Engineering of Executable Programs*, Proceedings of the Asia-Pacific Software Engineering Conference (APSEC), IEEE Computer Society Press, Brisbane, Australia, December 1995, pp. 410–419

Cifuentes, C., and Gough K. J., *Decompilation of Binary Programs, Software—Practice & Experience*, Vol. 25 (7), July 1995, 811–829

Reilly, D., *Decompilers—friend or foe*. Web article available at http://www.javacoffeebreak.com/articles/decompilers_friend_or_foe.ht ml) (updated Jun. 2, 2001)

Breuer, P. T. and Bowen, J. P., *Generating Decompilers*, RUCS Technical Report, RUCS/1998/TR/010/A, Department of Computer Science, The University of Reading, October 1998 (available at http://www.museophile.sbu.ac.uk/pub/jpb/decomp-tr98.pdf)

Saul, J. M., *Hardware Software Codesign for FPGA-Based Systems*, Proceedings of the 32nd Hawaii International Conference on System Sciences, 1995

Cifuentes, C., *Partial Automation of an Integrated Reverse Engineering Environment of Binary Code*, Proc. Third Working Conference on Reverse Engineering, Monterey, Calif. (IEEE-CS Press), Nov. 8–10, 1996, pp. 50–56

Blume, W. and Eigenmann, R., *Demand-driven, Symbolic Range propagation*, Proc. of the 8th Workshop on Languages and Compilers for Parallel Computing, Columbus, Ohio, August 1995, pp. 141–160 (available at http://citeseer.nj.nec.com/42309.html)

Patterson, J. R. C., *Accurate Static Branch Prediction by Value Range Propagation*, Proc. ACM SIGPLAN '95 Conf. on Programming Language Design and Implementation, June 1995, pp. 67–78

Cifuentes, C., Waddington, T., and Van Emmerik, M., *Computer Security Analysis through Decompilation and High-Level Debugging*, Proceedings of the Working Conference on Reverse Engineering, Workshop on Decompilation Techniques, Stuttgart, Germany (IEEE Press), Oct. 3, 2001, pp 375–380

Cifuentes, C., Simon, D. and Fraboulet, A., *Assembly to High-Level Language Translation*, Proc. of the Intl. Conference on Software Maintenance, Washington D.C., (IEEE Press), Nov. 18–20, 1998, pp. 228–237

Cifuentes, C., *Structuring Decompiled Graphs*, Proc. Intl. Conf. on Compiler Construction (CC'96), Lecture Notes in Computer Science 1060, Linkoping, Sweden, Apr. 22–26, 1996, pp. 91–105

Cifuentes, C., *Interprocedural Data Flow Decompilation*, Journal of Programming Languages. Vol. 4, 1996, pp. 77–99

Cifuentes, C., *Reverse Compilation Techniques*, PhD thesis, Faculty of Information Technology, Queensland University of Technology, July, 1994

Cifuentes, C. and Gough, K. J., *A Methodology for Decompilation*, Proceedings of the XIX Conferencia Latinoamericana de Informatica, Buenos Aires, August 1993, pp. 257–266

Cifuentes, C., *A Structuring Algorithm for Decompilation*, Proceedings of the XIX Conferencia Latinoamericana de Informatica, August 1993, Buenos Aires, pp. 267–276

The nanocode model resulting from the decompilation process forms the basis for (or input to) a software vulnerability or flaw analysis. In other words, the intermediate representation can be chosen so that model can be easily analyzed for software flaws, security vulnerability, and performance issues. It is not necessary to transform the model into a high-level language prior to analysis; it is understood to be more efficient to decompile the software of interest into an IR (or set of IRs) in a common representation, e.g., DIL. Suites of software vulnerability and other analysis tools, including scripts and automated processes, can thus be developed to operate on the IR only. These suites and tools need not be customized for the peculiarities and multiple grammars of high-level languages at all.

Intermediate representations of modeled executable code can thus be scanned or analyzed for flaws or conditions, especially including security holes, buffer structure flaws exploitable via "buffer overflow" attack, and other known and unknown risk factors. Such use is of great interest in the software arts today as a means of certifying software as trusted and/or determining whether software is safe to operate in mission-critical applications, for example.

Alternatively, the above-described analytical tool set can be used to analyze changes between allegedly different (or allegedly identical) versions of software or differences between two nominal "copies" of the same software to determine if both copies will operate as expected. Furthermore, it can be used for code recovery when the original source code has been lost, destroyed, or otherwise corrupted. Even more directly, it can be used to simply determine what an unknown program does or how well it does it (in a forensics or quality assurance sense).

Block Diagrams

FIG. 1 shows a high-level modularity dependence diagram of one embodiment of a nanocode decompiler and analysis system 200, such as SAF. Graphical User Interface (GUI) 210 provides the user-facing interface for operating the system. This interface may take many forms and may be customizable to the individual user's requests and requirements. Such graphic user interfaces are typically found in common commercial software and are not further explained herein.

The main working area of the system is found within viewer project 220. In viewer project 220, the user can look at the various analysis projects he or she has in work, represented by icons and file descriptors for the various files and working analysis documents stored on the user's computer. The user can view a model for a particular target executable, using model viewer extension 225, or generate and review a report based on both a model and/or previously performed analytical tasks. Report viewing may be accomplished using report generator extension 227.

Alternatively, the user can begin a new project by loading and modeling a new piece of executable code using modeler extension 230. Modeler extension 230 provides the user interface to set up and operate the modeling function; the modeling function is actually performed by modeler 250.

FIG. 2 is a conceptual overview of the major components of one embodiment of the present system, the Software Analysis Framework system. FIG. 2 also shows, in an operational sense, how the major elements of the SAF can interact with each other.

SAF operations beings with executable code file 301, which is the input source or "target" executable code to be analyzed. Loader function 305 reads the executable code 301 and separates out the relocated and bound images and the code and the data sections (when present) of executable 301. This separated code is represented in by oval 306.

A static library identifier function 307 compares the separated sections 306 against a library signature table 310C, which is itself the output of block 310. (Block 310 produces a set of library signatures in table form 310C using signature generator 310B and an input set of typical system libraries 310A). These typical system libraries 310A are a set of industry standard or analyst-generated generic libraries of software routines that are typically used in applications similar to that of the executable 301. Accordingly, block 310 shows these generic system libraries 310A being converted via signature generator 310B into library signature table 301C, which is (in effect) a database of system library signatures. These libraries and signatures are assembled through means well-known in the art, such as those described at http://www.datarescue.com/idabase/flirt.htm and in M. Van Emmerik, "Signatures for Library Functions in Executable Files Using Patterns," Proceedings of the 1998 Australian Software Engineering Conference, Adelaide, 9th to 13th Nov., 1998, IEEE-CS Press, pp. 90–97, hereby incorporated herein by reference in their entireties.

The output of static library identifier 307 (shown in FIG. 2B) is imported as unprocessed code in block 312. The code graph from that imported code is saved in block 314. The unprocessed code is then processed, first through a step that identifies procedures within the code in block 316. Next, environment calls within the code are converted, block 318, into symbolic representations.

The symbolic representations of the environment calls, procedures, and the code graph are then input to a variablizer block 320. The output of the variablizer is then processed in code discovery block 330.

Variablizer 320 comprises, in one embodiment of the present invention, a variablizer unit 322, argument detection block 324, type voting unit 326, and a simplification processor block 328. Variablizer 320 includes resource reconciliation and mapping as well as symbol interpretation and insertion. The code is run through blocks 322–328 iteratively (shown by the arrow connecting the output of simplification block 328 to variablizer unit 322) until there are no more variables to process.

Code discovery block 330 cooperates with range propagation block 332 to identify and maintain listings of the variable ranges encountered during processing. The output of code discovery block 330 passes through an optimization and simplification step (block 334) and a type voting step (block 336) before the variables in each procedure call are finally converted in step 338.

Figure 2A:
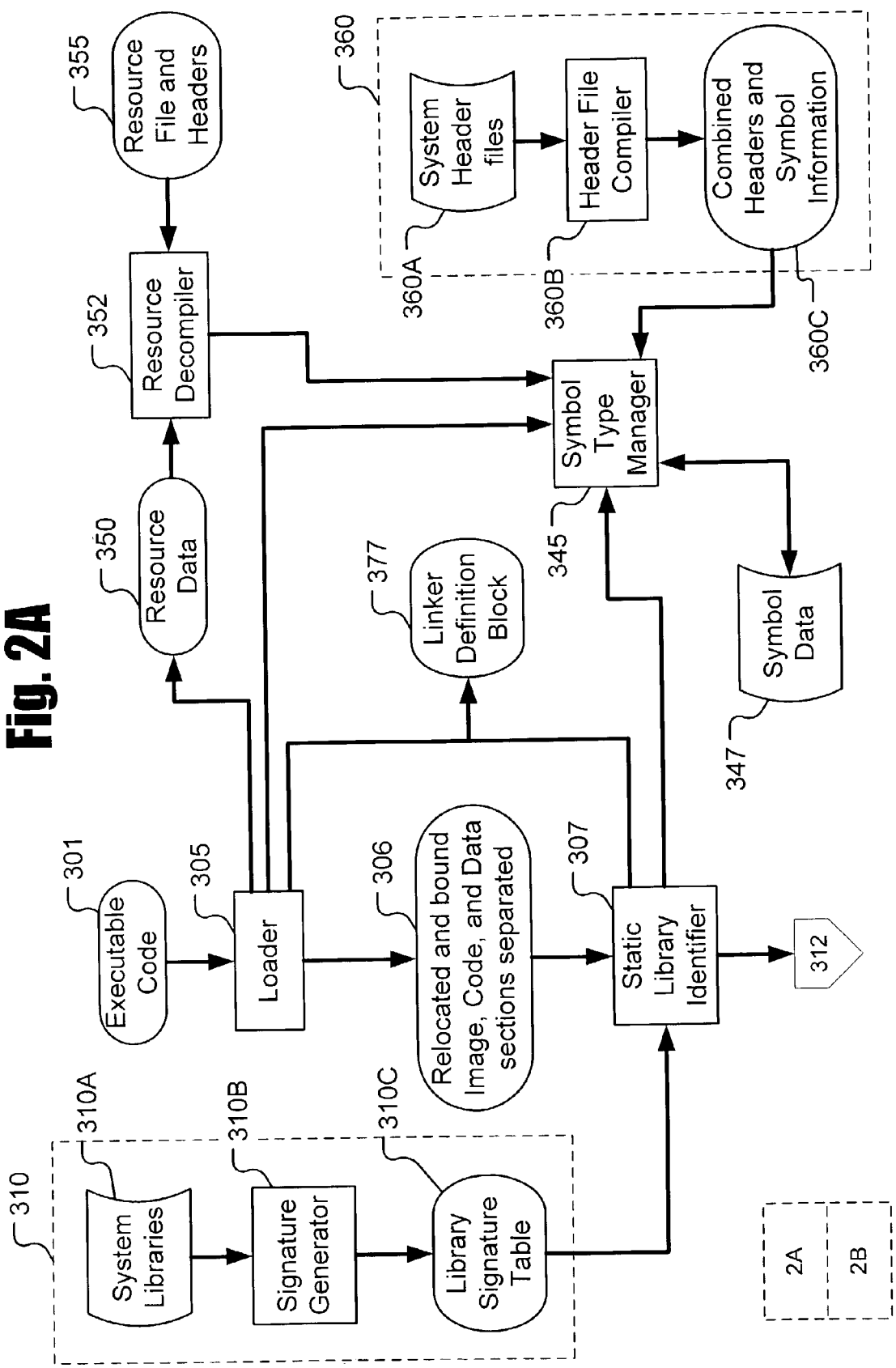
FIGS. 2A and 2B are conceptual overviews of a nanocode decompiler in detailed block diagram form, according to one embodiment of the invention.
Figure 2B:
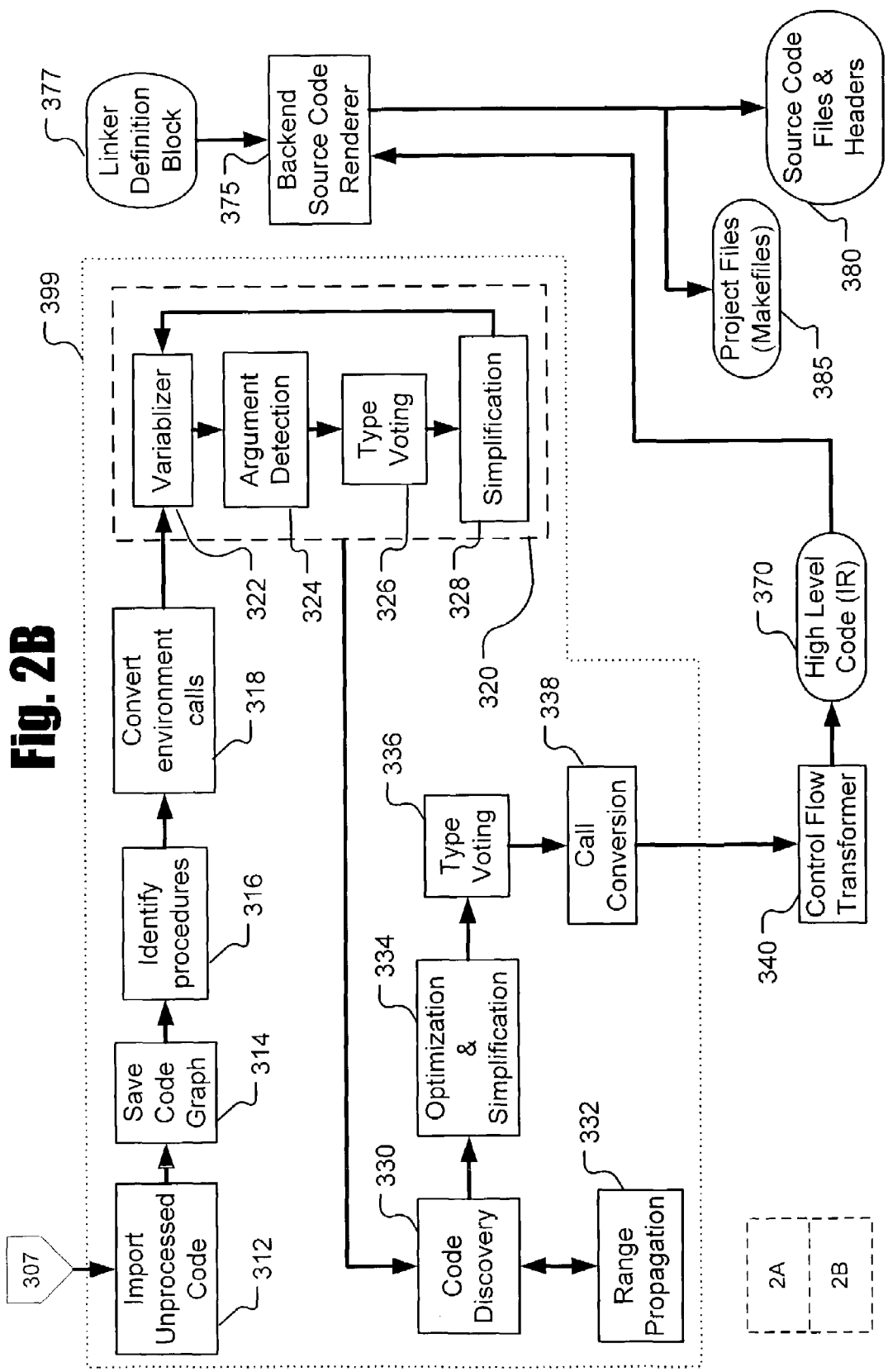

The code discovery process of block 330 and the related steps performed by blocks 334–338 are further explained by reference to FIG. 2A. In short, all symbol data type information is managed by symbol type manager 345, which stores its data in symbol table 347. Reconciled symbol data is supplied via symbol data table 347. Symbol table 347 is accessed by both the variablizer process 320 and code discovery process of blocks 330–338.

Symbol type manager 345 obtains its data from four sources: Static library identifier 307 provides static library data; loader 305 provides relocation and code/data binding information; resource decompiler 352 provides resource and file header information; and system header file compilation block 360 provides system header file information. The sources of each input to symbol type manager 345 are discussed further below.

The output of loader 305 and static library identifier 307 are merged with the output of resource decompiler 352 and symbol type manager 345 into symbol data table 347 to both expand the population of the symbol table and determine variable types.

Resource decompiler 352 is driven with resource data 350 directly from loader 305. Loader 305 may determine resource data 350 by direct analysis of executable code 301. Resources are decompiled in functional block 352 by means well-known in the art. As further inputs to resource decompiler 352, resource and file data and file headers 355 are provided much in the same way as system library information 310 is supplied to the static library identifier 307.

In system header file compilation block 360, a set of generic system files 360A (analogous to generic system libraries 310A) are compiled by header file compiler 360B, and provided in compiled form (with symbol information) in block 360C. The output of block 360C is then supplied to symbol type manager 345.

Returning to FIG. 2B, blocks 312–338 (collectively, block 399) represent the data flow transformer and code discovery function. The output of block 399, which is the data flow graph (not shown), is passed to control flow transformer 340. Control flow is determined through means well-known in the art and results in a set of data and control flow graphs and associated parameters, themselves represented by high level code 370.

High level code (or intermediate representation, IR) 370 is a complete nanocode representation of executable code 301 in an intermediate representation (e.g., DIL). Both the control flow and data flow of the original executable code are completely modeled down to and including functions provided by the microcode of the original target processor. This latter information (target processor information) comes into the SAF via system libraries 310A and system header files 360A, described above. All these elements together are combined through the various steps outlined above to produce intermediate representation 370.

High level code 370 is, in some embodiments, a language-independent intermediate representation (IR) of the input executable code 301. Specifically, the IR 370 is in a language devised to provide a processor-independent, portable representation of the nanocode functionality of executable 301. In an exemplary embodiment, the IR is DIL.

IR 370 can optionally be input to backend source code renderer 375. Backend source code renderer 375 takes its link data from loader 305 in block 377; i.e., loader 305 and static library identifier 307 may, in some embodiments, be capable of deriving linker definition information 377 as part of their functions. Linker definition block information 377 may then be used by backend source code renderer 375 to create source code output files and headers 380, as well as project files and makefiles 385 usable to compile and link the source code file 380 into executable code.

In some embodiments, backend source code renderer 375 may be capable of rendering into more than one high-level language. Conceptually, different source code renderers 375 could be created for rendering into different source languages such as C++ or Java. Alternatively, a single source code render could have multiple operating modes whereby it could turn IR 370 into any number of source code output files 380.

Operations

FIG. 3 illustrates a software analysis and generation configuration 400 using SAF in the form of a modularity dependence diagram. Here, arrowheads show the dependence of one module or function on another, not the flow of data.

As described above with respect to FIG. 1, GUI 410 may take one of several forms well-known in the art. However, in the analysis generation configuration, the focus of SAF operation is on creating complete nanocode models for software vulnerability and/or quality assessment and related analysis and results reporting. Accordingly, three major functions are initially performed from GUI 410.

Environment compiler 415, binary analysis project 420, and source analysis project 430 are alternate forms of somewhat analogous modeling tools. Each starts from a different set of inputs and produces parameters for use by modeler 450. For example, environment compiler 415 looks at the environmental variables and configuration in which the input executable code operates. After parsing these environmental variables, environment compiler 415 provides inputs to modeler extension 460, i.e., modeler extension 460 depends on the results of environment compiler 415. Likewise, binary analysis project 420 begins by analyzing the input executables and provides the resulting model data to modeler extension 460 as well as to model editor extension 440.

Alternatively, source analysis project 430 can be used to begin the modeling project from the actual source code (when available) of the target executable. Source analysis project 430 outputs are then sent to modeler extension 460 and model editor extension 440.

The source analysis capability of source analysis project 430 provides the capability for cooperative software analysis and vulnerability (or performance) assessment. As known in the art, the term "cooperative analysis" refers to analysis on behalf of a client who is willing to supply the original source code for a given executable program. SAF provides source code analysis through the source analysis project functions 430 shown in FIG. 3.

Finally, modeler 450 provides information about processor architecture 451 (e.g., Intel, Java, SPARC), software compiler 452 (e.g., MSVC, gcc, Sun C), decompilation phases 453 (e.g., DFA, CFA, unlinking) source code parsers 454 (C, Java, etc.), and source code generators 455 (C, Java, etc.).

Reporting

The data and control flow graphs produced above may be output along with the nanocode and notes created by an analyst in a text or other well-known in the art "reader" documents, such as plain ASCII text, Adobe PDF, or other portable document. Alternatively, separate documents may be created containing one or more of the outputs noted.

ALTERNATE EMBODIMENTS

The order in which the steps of the present method are performed is purely illustrative in nature. In fact, the steps can be performed in any order or in parallel, unless otherwise indicated by the present disclosure.

The method of the present invention may be performed in either hardware, software, or any combination thereof, as those terms are currently known in the art. In particular, the present method may be carried out by software, firmware, or microcode operating on a computer or computers of any type. Additionally, software embodying the present invention may comprise computer instructions in any form (e.g., source code, object code, interpreted code, etc.) stored in any computer-readable medium (e.g., ROM, RAM, magnetic media, punched tape or card, compact disc (CD) in any form, DVD, etc.). Furthermore, such software may also be in the form of a computer data signal embodied in a carrier wave, such as that found within the well-known Web pages transferred among devices connected to the Internet. Accordingly, the present invention is not limited to any particular platform, unless specifically stated otherwise in the present disclosure.

While particular embodiments of the present invention have been shown and described, it will be apparent to those skilled in the art that changes and modifications may be made without departing from this invention in its broader aspect and, therefore, the appended claims are to encompass within their scope all such changes and modifications as fall within the true spirit of this invention.

I claim:

1. A method of analyzing executable software code by decompiling said executable code, comprising:
   parsing said executable software code to identify one or more data flows; recursively, for each identified one or more data flow:
   discovering a fitting data flow model fitting the respective identified data flow;
   optimizing said fitting data flow model as a function of the respective identified data flow to form a refined data flow model;
   propagating said refined data flow model as a function of the respective identified data flow until substantially all data variables are modeled; and
   expressing said refined data flow model in an intermediate representation; parsing said executable software code to identify one or more control flows; recursively, for each identified one or more control flow:
   discovering a fitting control flow model fitting the respective identified control flow, comprising one or more control branches;
   optimizing said fitting control flow model as a function of the respective identified control flow to form a refined control flow model;
   propagating said refined control flow model as a function of the respective identified control flow until substantially all said control branches are modeled; and
   expressing said refined control flow model in said intermediate representation;
   wherein said refined data flow model and said refined control flow model express a complete nanocode model of said executable software code in said intermediate representation.

2. The method of claim 1, further comprising translating said intermediate representation into a high-level language.

3. The method of claim 1, further comprising analyzing said nanocode model.

4. The method of claim 3, wherein said analyzing further comprises:
   comparing said nanocode model to a reference nanocode model;
   forming a report listing differences;
   flagging said differences according to risk severity inherent therein.

5. The method of claim 3, wherein said analyzing further comprises:
   performing one or more analytic tasks using one or more corresponding pre-defined task scripts, said task scripts comprising a plurality of search, control, and/or data instructions to be executed by a control process and producing a result; and
   forming a report based on said results of said scripts.

6. The method of claim 5, wherein said task scripts comprise pre-existing scripts and scripts adapted from previous uses.

7. The method of claim 5, wherein said report comprises plain language statements and one or more optional nanocode model annotations.

8. The method of claim 1, wherein said intermediate representation is the Dil Intermediate Language (DIL).

9. The method of claim 1 wherein:
   discovering a fitting data flow model comprises:
   generating a data flow signature for the respective identified data flow; and
   comparing the generated data flow signature to a plurality of stored predetermined data flow signatures, each stored predetermined data flow signature representing a known data flow model; and
   discovering a fitting control flow model comprises:
   generating a control flow signature for the respective identified control flow; and
   comparing the generated control flow signature to a plurality of stored predetermined control flow signatures, each stored predetermined control flow signature representing a known control flow model.

10. An apparatus for analyzing executable software code by decompiling said executable code, comprising:
    first means for parsing said executable software code to identify one or more data flows;
    means for recursively, for each identified one or more data flow:
    discovering a fitting data flow model fitting the respective identified data flow;
    optimizing said fitting data flow model as a function of the respective identified data flow to form a refined data flow model;
    propagating said refined data flow model as a function of the respective data flow until substantially all data variables are modeled; and
    expressing said refined data flow model in an intermediate representation; second means for parsing said executable software code to identify one or more control flows;
    means for recursively, for each identified one or more control flow:
    discovering a fitting control flow model fitting the respective identified control flow, comprising one or more control branches;
    optimizing said fitting control flow model as a function of the respective identified control flow to form a refined control flow model;
    propagating said refined control flow model as a function of the respective identified control flow until substantially all said control branches are modeled; and
    expressing said refined control flow model in said intermediate representation;
    wherein said refined data flow model and said refined control flow model express a nanocode model of said executable software code in said intermediate representation.

11. The apparatus of claim 10, further comprising means for translating said intermediate representation into a high-level language.

12. The apparatus of claim 10, further comprising means for analyzing said nanocode model.

13. The apparatus of claim 12, wherein said means for analyzing further comprises:
    means for comparing said nanocode model to a reference nanocode model;
    means for forming a report listing differences; and
    means for flagging said differences according to risk severity inherent therein.

14. The apparatus of claim 12, wherein said means for analyzing further comprises:
    means for performing one or more analytic tasks using one or more corresponding pre-defined task scripts, said task scripts comprising a plurality of search, control, and/or data instructions to be executed by a control process and producing a result; and means for forming a report based on said results of said scripts.

15. The apparatus of claim 14, wherein said task scripts comprise pre-existing scripts and scripts adapted from previous uses.

16. The apparatus of claim 14, wherein said report comprises plain language statements and one or more optional nanocode model annotations.

17. The apparatus of claim 10, wherein said intermediate representation is the Dil Intermediate Language (DIL).

18. The apparatus of claim 10, wherein:
discovering a fitting data flow model comprises:
generating a data flow signature for the respective identified data flow; and
comparing the generated data flow signature to a plurality of stored predetermined data flow signatures, each stored predetermined data flow signature representing a known data flow model; and
discovering a fitting control flow model comprises:
generating a control flow signature for the respective identified control flow; and
comparing the generated control flow signature to a plurality of stored predetermined control flow signatures, each stored predetermined control flow signature representing a known control flow model.

19. A computer system for use in analyzing executable software code by decompiling said executable code, the system comprising computer instructions for:
parsing said executable software code to identify one or more data flows;
recursively, for each identified one or more data flow:
discovering a fitting data flow model fitting the respective identified data flow;
optimizing said fitting data flow model as a function of the respective identified data flow to form a refined data flow model;
propagating said refined data flow model as a function of the respective identified data flow until substantially all data variables are modeled; and
expressing said refined data flow model in an intermediate representation;
parsing said executable software code to identify one or more control flows;
recursively, for each identified one or more control flow:
discovering a fitting control flow model fitting the respective identified control flow comprising one or more control branches;
optimizing said fitting control flow model as a function of the respective identified control flow to form a refined control flow model;
propagating said refined control flow model as a function of the respective identified control flow until substantially all said control branches are modeled; and
expressing said refined control flow model in said intermediate representation;
wherein said refined data flow model and said refined control flow model express a nanocode model of said executable software code in said intermediate representation.

20. The computer system of claim 19, further comprising computer instructions for translating said intermediate representation into a high-level language.

21. The computer system of claim 19, further comprising computer instructions for analyzing said nanocode model.

22. The computer system of claim 21, wherein said computer instructions for analyzing further comprise computer instructions for:
comparing said nanocode model to a reference nanocode model;
forming a report listing differences; and
flagging said differences according to risk severity inherent therein.

23. The computer system of claim 21, wherein said computer instructions for analyzing further comprise computer instructions for:
performing one or more analytic tasks using one or more corresponding pre-defined task scripts, said task scripts comprising a plurality of search, control, and/or data instructions to be executed by a control process and producing a result; and
forming a report based on said results of said scripts.

24. The computer system of claim 23, wherein said task scripts comprise pre-existing scripts and scripts adapted from previous uses.

25. The computer system of claim 23, wherein said report comprises plain language statements and one or more optional nanocode model annotations.

26. The computer system of claim 19, wherein said intermediate representation is the Dil Intermediate Language (DIL).

27. The system of claim 19, wherein:
discovering a fitting data flow model comprises:
generating a data flow signature for the respective identified data flow; and
comparing the generated data flow signature to a plurality of stored predetermined data flow signatures, each stored predetermined data flow signature representing a known data flow model; and
discovering a fitting control flow model comprises:
generating a control flow signature for the respective identified control flow; and
comparing the generated control flow signature to a plurality of stored predetermined control flow signatures, each stored predetermined control flow signature representing a known control flow model.

28. A computer-readable medium storing a computer program for use in analyzing executable software code by decompiling said executable code, said computer program executable by a plurality of server computers, the medium comprising computer instructions for:
parsing said executable software code to identify one or more data flows;
recursively, for each identified one or more data flow:
discovering a filling data flow model fitting the respective identified data flow;
optimizing said filling data flow model as a function of the respective identified data flow to form a refined data flow model;
propagating said refined data flow model as a function of the respective identified data flow until substantially all data variables are modeled; and
expressing said refined data flow model in an intermediate representation;
parsing said executable software code to identify one or more control flows;
recursively, for each identified one or more control flow:
discovering a filling control flow model fitting the respective identified control flow comprising one or more control branches;

optimizing said filling control flow model as a function of the respective identified control flow to form a refined control flow model;

propagating said refined control flow model as a function of the respective identified control flow until substantially all said control branches are modeled; and expressing said refined control flow model in said intermediate representation;

wherein said refined data flow model and said refined control flow model express a nanocode model of said executable software code in said intermediate representation.

29. The computer-readable medium of claim 28, further comprising computer instructions for translating said intermediate representation into a high-level language.

30. The computer-readable medium of claim 28, further comprising computer instructions for analyzing said nanocode model.

31. The computer-readable medium of claim 30, wherein said computer instructions for analyzing further comprise computer instructions for:

comparing said nanocode model to a reference nanocode model;

forming a report listing differences; and flagging said differences according to risk severity inherent therein.

32. The computer-readable medium of claim 30, wherein said computer instructions for analyzing further comprise computer instructions for:

performing one or more analytic tasks using one or more corresponding pre-defined task scripts, said task scripts comprising a plurality of search, control, and/or data instructions to be executed by a control process and producing a result; and forming a report based on said results of said scripts.

33. The computer-readable medium of claim 32, wherein said task scripts comprise pre-existing scripts and scripts adapted from previous uses.

34. The computer-readable medium of claim 32, wherein said report comprises plain language statements and one or more optional nanocode model annotations.

35. The computer-readable medium of claim 28, wherein said intermediate representation is the Dil Intermediate Language (DIL).

36. The computer-readable medium of claim 28, wherein:

discovering a fitting data flow model comprises:

generating a data flow signature for the respective identified data flow; and comparing the generated data flow signature to a plurality of stored predetermined data flow signatures, each stored predetermined data flow signature representing a known data flow model; and discovering a fitting control flow model comprises:

generating a control flow signature for the respective identified control flow; and comparing the generated control flow signature to a plurality of stored predetermined control flow signatures, each stored predetermined control flow signature representing a known control flow model.

* * * * *